Patented July 17, 1934

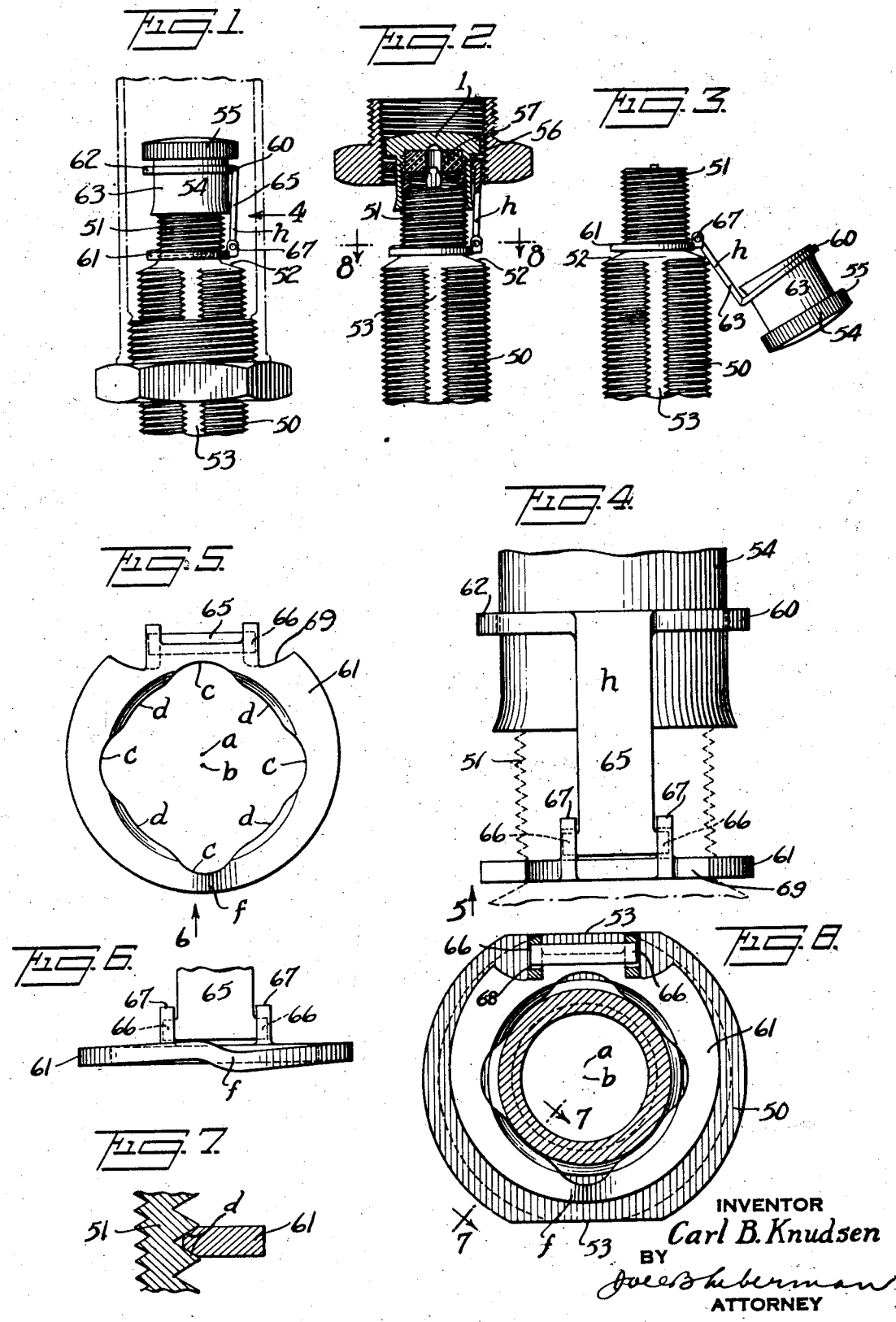

1,966,506

UNITED STATES PATENT OFFICE 1,966,506

CAPTIVE CAP FOR VALVE STEMS

Carl B. Knudsen, Mamaroneck, N. Y., assignor to The Cap Coupler Corp., New York, N. Y., a corporation of New York Application July 6, 1931, Serial No. 548,728

6 Claims. (Cl. 152—12)

The present invention relates to captive caps for valve stems and is more particularly directed toward the manufacture of captive caps suitable for use on the valve stems of pneumatic tires.

It is customary to provide pneumatic tires with stems having reduced threaded necks adapted to house the valve mechanism and to receive a small threaded cap. Many of these valve stems are provided with a long threaded body having two flattened sides and adapted to receive a yoke, washer and nut for securing the valve stem to the inner tube. The valve stem is secured in place in the wheel by a second nut threaded along the body of the valve stem. This latter mentioned nut must be taken off the valve stem and passed by the cap when the tire is to be removed from the wheel and must be passed down over the cap and threaded in place after the tire is placed on the wheel.

The present invention contemplates the provision of a captive cap wherein the parts are so designed that they are all confined within the radius of the root of the threads of the valve stem so that they will not interfere with the removal or replacement of the nut on the valve stem.

The invention also contemplates a captive cap supporting means made in the form of two simple stampings, one adapted to loosely encircle the cap and to be non-removably carried thereby and the other adapted to be threaded along the neck of the valve stem.

According to the preferred form of the present invention, the ring adapted to be threaded on the valve stem is stamped to such shape as to fit the threads on the valve stem and is provided with integral upwardly bent lugs adapted to receive an extension integral with the ring which encircles the cap. A further object of the invention is to so design the cap securing means that it is capable of being positioned so as not to interfere with passing the yoke back and forth along the stem, hence making it unnecessary to remove the cap and support when inserting, removing, or replacing the yoke.

A further object of the invention is to so design the parts that the cap swings far enough away from the end of the stem so as not to interfere with the application of the air hose used to supply air to the tire. Other and further objects will appear as the description proceeds.

Certain of the broader features of construction herein disclosed are claimed in my copending application for Captive caps, executed concurrently herewith, filed July 6, 1931, as Serial No. 548,727.

The accompanying drawing shows, for purposes of illustrating the present invention, one of the many forms in which it may be embodied, it being understood that the form shown is illustrative of the invention rather than limiting the same.

In the drawing:

Fig. 1 is a side elevational view of a valve stem for pneumatic tires showing the captive cap in position on the valve stem and showing the usual valve stem locking nut threaded part way down the stem;

Fig. 2 is a view similar to Fig. 1, the cap being in section and the locking nut being partly removed;

Fig. 3 is an elevational view of the valve stem with the cap swung back;

Fig. 4 is an enlarged elevational view of the cap, stem, and rings;

Fig. 5 is a view taken in the direction of the arrow 5 of Fig. 4 showing the lower ring in elevation;

Fig. 6 is a view taken in the direction of the arrow 6 of Fig. 5;

Fig. 7 is a section on the line 7—7 of Fig. 8; and

Fig. 8 is a section through the valve stem on the line 8—8 of Fig. 2.

The threaded portion of a pneumatic tire valve stem is indicated at 50. It has the usual threaded neck 51, shoulder 52, and flat sides indicated at 53 to accommodate the clamping yoke used in securing the stem to the pneumatic tube. The cap is indicated at 54. It may be made by a screw machine and is provided with the usual knurled upper flange or grip 55 and internally threaded socket 56 adapted to cooperate with the threads 51 on the neck of the tube stem. It also carries the usual rubber gasket 57.

The cap and valve stem are connected together by a hinge mechanism generally indicated by the reference character $h$ which consists of two stampings 60 and 61 made of comparatively heavy gauge sheet brass. The stamping 60 has a ring portion 62 adapted to be received on the skirt portion 63 of the cap 54 and a downwardly extending portion 65 having short outwardly extending lugs or pintles indicated at 66. The lower member 61 is also made out of sheet brass and is generally in the shape of a ring. The ring has two upwardly bent ears or lugs 67 apertured as indicated at 68, adapted to receive the pintles formed by the extensions 66 so that these two stampings may be hingedly connected.

The shape of the ring 61 is most clearly shown in Figs. 5 to 8. It is shaped to facilitate threading it onto the neck of the valve stem and to provide sufficient material from which to make a part of the hinge above referred to. The outside of the ring 61 has its center at *a* while the center of the inner hole is displaced as indicated at *b*. By thus offsetting the centers *a* and *b*, it is possible to provide a ring which would be wider at one side than the other. During the stamping operation the holes 68 are punched in the wider portion of the ring, the lugs are cut along the line 69 and then bent up to the position indicated. The inner hole is of irregular contour as indicated more clearly in Fig. 5. As shown at *c*, four points on the inner periphery of the ring are at a greater diameter than the intermediate parts *d*. During the stamping process these intermediate parts *d* are beveled or swedged as indicated in Fig. 7 and by the shading in Figs. 5 and 8, and the ring is offset as indicated at *f* in Fig. 6. The object of thus offsetting the ring and stamping the beveled or swedged portions *d* is to provide the elements of a complete screw thread adapted to fit the threads 51 on the valve stem. As shown in Fig. 8, these ears 66 and the portion *f* of the ring may be turned so as to be opposite the flat parts 53 on the valve stem so as not to interfere with the passage of the clamping yoke along the stem.

It is obvious that the invention may be embodied in many forms and constructions, and I wish it to be understood that the particular form shown is but one of the many forms. Various modifications and changes being possible, I do not otherwise limit myself in any way with respect thereto.

What is claimed is:

1. The combination with the usual pneumatic tire valve stem having a threaded body, a reducing shoulder and a threaded neck, of a cap threaded onto the neck, a sheet metal stamping including a ring loosely and non-removably carried by the cap, a second sheet metal stamping including a ring carried by the neck of the valve stem adjacent the shoulder, and hinge connections between the stampings for securing the stampings together, the stampings and hinge connection being sufficiently small to be within the root diameter of the threads on the body of the valve stem whereby a nut cooperable with such threads may pass by the stampings and hinge connections therebetween.

2. The combination with the usual pneumatic tire valve stem having a threaded body, a reducing shoulder and a threaded neck, of a cap threaded onto the neck, a sheet metal stamping including a ring loosely and non-removably carried by the cap, a second sheet metal stamping including a ring carried by the neck of the valve stem adjacent the shoulder and stamped to a shape to fit the threads thereon, and hinge connections between the stampings for securing the stampings together, the stampings and hinge connections being sufficiently small to be within the root diameter of the threads on the body of the valve stem whereby a nut cooperable with such threads may pass by the stampings and hinge connections therebetween.

3. The combination with the usual pneumatic tire valve stem having a threaded body, a reducing shoulder and a threaded neck, of a cap threaded onto the neck, a sheet metal stamping including a ring loosely and non-removably carried by the cap, a second sheet metal stamping including a ring carried by the neck of the valve stem adjacent the shoulder, and hinge connections formed by integral parts of the stampings for securing the stampings together, the stampings and hinge connections being sufficiently small to be within the root diameter of the threads on the body of the valve stem whereby a nut cooperable with such threads may pass by the stampings and hinge connections therebetween.

4. The combination with the usual pneumatic tire valve stem having a threaded body provided with flat sides to receive the usual yoke, a reducing shoulder and a threaded neck, of a cap threaded onto the neck, a sheet metal stamping including a ring loosely and non-removably carried by the cap, a second sheet metal stamping including a ring carried by the neck of the valve stem adjacent the shoulder, and hinge connections between the stampings for securing the stampings together, the stampings and hinge connections being sufficiently small to be within the root diameter of the threads on the body of the valve stem whereby a nut cooperable with such threads may pass by the stampings and hinge connections therebetween, the stampings being also of smaller dimension than such body of the valve stem.

5. The combination with the usual pneumatic tire valve stem having a threaded body, a reducing shoulder and a threaded neck, of a cap threaded onto the neck, a sheet metal stamping including a ring loosely and non-removably carried by the cap, a second sheet metal stamping including a ring carried by the neck of the valve stem adjacent the shoulder, and hinge connections between the stampings for securing the stampings together, said hinge connections including integral apertured lugs carried by the second ring and an extension having projections received within the apertured lugs, the stampings and hinge connections being sufficiently small to be within the root diameter of the threads on the body of the valve stem whereby a nut cooperable with such threads may pass by the stampings and hinge connections therebetween.

6. The combination with the usual pneumatic tire valve stem having a threaded body, a reducing shoulder and a threaded neck, of a cap threaded onto the neck, a sheet metal stamping including a ring loosely and non-removably carried by the cap, a second sheet metal stamping including a ring carried by the neck of the valve stem adjacent the shoulder and stamped to a shape to fit the threads thereon, and hinge connections between the stampings for securing the stampings together, said hinge connections including integral apertured lugs carried by the second ring and an extension having projections received within the apertured lugs, the stampings and hinge connections being sufficiently small to be within the root diameter of the threads on the body of the valve stem whereby a nut cooperable with such threads may pass by the stampings and hinge connections therebetween.

CARL B. KNUDSEN.